(12) United States Patent
Choi et al.

(10) Patent No.: US 8,834,086 B2
(45) Date of Patent: Sep. 16, 2014

(54) THREADED ENGAGEMENT DEVICE

(71) Applicant: TaeguTec, Ltd., Daegu (KR)

(72) Inventors: Chang Hee Choi, Daegu (KR); Kil Sung Kim, Daegu (KR)

(73) Assignee: TaeguTec, Ltd., Dalseong-gun, Daegu (KR)

( * ) Notice: Subject to any disclaimer, the term of this patent is extended or adjusted under 35 U.S.C. 154(b) by 136 days.

(21) Appl. No.: 13/742,215

(22) Filed: Jan. 15, 2013

(65) Prior Publication Data
US 2013/0136533 A1    May 30, 2013

Related U.S. Application Data

(63) Continuation-in-part of application No. PCT/KR2011/005239, filed on Jul. 15, 2011.

(30) Foreign Application Priority Data

Jul. 16, 2010 (KR) .......................... 10-2010-0069056

(51) Int. Cl.
*F16B 33/02* (2006.01)
*F16B 7/18* (2006.01)
*B21B 99/00* (2006.01)

(52) U.S. Cl.
CPC . *F16B 7/18* (2013.01); *F16B 33/02* (2013.01); *B21B 99/00* (2013.01)
USPC ........................................ 411/366.1; 411/411

(58) Field of Classification Search
USPC ................ 411/366.1, 411, 414, 311
See application file for complete search history.

(56) References Cited

U.S. PATENT DOCUMENTS 2,567,483 A * 9/1951 Hotine ............................ 74/441
4,549,754 A * 10/1985 Saunders et al. .............. 285/334
4,734,002 A 3/1988 Holmes
4,907,926 A 3/1990 Wing (Continued)

FOREIGN PATENT DOCUMENTS

| JP | 08-177839 A | 7/1996 |
| JP | 2003-004016 A | 1/2003 |
| JP | 2007-132398 A | 5/2007 |
| WO | WO 2009/023166 | 2/2009 |

OTHER PUBLICATIONS

International Search Report dated Feb. 29, 2012 issued in PCT counterpart application (No. PCT/KR2011/005239).

(Continued)

*Primary Examiner* — Flemming Saether
(74) *Attorney, Agent, or Firm* — Womble Carlyle

(57) ABSTRACT

The threaded engagement device includes a female thread portion and a male thread portion, which are engaged to each other through a plurality of threads formed along the axis direction. Each thread of the female thread portion and the male thread portion of the threaded engagement device includes a crest, a root, a stab flank and a load flank. The root of the female thread portion has a straight portion extending along the axis direction and a concave rounded portion. The root of the male thread portion has a concave rounded portion, wherein the radius of curvature of the rounded portion formed in the root of the male thread portion is larger than the radius of curvature of the rounded portion formed in the root of the female thread portion.

10 Claims, 3 Drawing Sheets

(56) References Cited

U.S. PATENT DOCUMENTS

| | | | |
|---|---|---|---|
| 4,915,559 A * | 4/1990 | Wheeler et al. | 411/366.3 |
| 5,060,740 A * | 10/1991 | Yousef et al. | 175/415 |
| 5,672,037 A * | 9/1997 | Iwata | 411/311 |
| 6,454,315 B1 * | 9/2002 | Yamaguchi | 285/334 |
| 7,731,466 B2 * | 6/2010 | Shea et al. | 411/366.3 |
| 7,753,631 B2 * | 7/2010 | Sugimura | 411/366.1 |
| 7,997,842 B2 | 8/2011 | Diekmeyer | |

OTHER PUBLICATIONS

Official Action dated Oct. 11, 2013 issued in Japanese counterpart application (No. 2013-519609).

* cited by examiner

THREADED ENGAGEMENT DEVICE

CROSS-REFERENCE TO RELATED APPLICATIONS

This is a continuation-in-part of PCT application No. PCT/KR011/005239, filed Jul. 15, 2011, which claims the benefit of Korean Patent Application No. 10-2010-0069056, filed Jul. 16, 2010. The contents of the aforementioned applications are hereby incorporated by reference in their entirety.

TECHNICAL FIELD

The present invention generally relates to a threaded engagement device. More specifically, the present invention relates to a threaded engagement device for fastening two separate members by engaging a plurality of threads formed in the female thread portion and the male thread portion.

BACKGROUND ART

A threaded engagement device has been widely used as a method of fastening two separate members. FIG. 8 shows the threaded engagement structure of a conventional threaded engagement device for fastening two members by threaded engagement. A threaded engagement device 100 is conventionally configured to fasten and secure a member with a female thread portion 110 and a member with a male thread portion 120 by engaging a plurality of threads formed in the female thread portion 110 and a plurality of threads formed in the male thread portion 120.

In a conventional threaded engagement device 100 such as that shown in FIG. 8, four thread surfaces of a plurality of threads formed in the female thread portion 110 and the male thread portion 120 (i.e., crest 111, 121, root 112, 122, stab flank 113, 123 and load flank 114, 124) are formed as a straight line. Further, the conventional threaded engagement device 100 is configured such that when the threaded engagement device 100 is engaged, the load flank 114 of the female thread portion 110 and the load flank 124 of the male thread portion 120 are contacted with each other, thereby fastening the threaded engagement device 100.

Such conventional threaded engagement device 100 is configured such that when the external force is applied in the opposite direction to the threaded engagement direction (in the direction "B" in FIG. 8), the load flank 114 of the female thread portion 110 and the load flank 124 of the male thread portion 120 receive the external force. Thus, in such conventional threaded engagement device 100, when the large external force is applied in the opposite direction to the threaded engagement direction (in the direction "B" in FIG. 8), significant stress is applied to the foot of the load flank 114 of the female thread portion 110 ("X" in FIG. 8) and the foot of the load flank 124 of the male thread portion 120 ("Y" in FIG. 8) to damage the threads of the female thread portion 110 and the male thread portion 120.

As shown in FIG. 8, the conventional threaded engagement device 100 is further configured such that the load flanks 114, 124 make a positive angle α with a straight line perpendicular to the threaded engagement axis, i.e., the load flank 114 makes an obtuse angle β with the crest 111 and the load flank 124 makes an obtuse angle β with the crest 121. In such a structure, the female thread portion 110 receives a force outward of the male thread portion 120 (in the direction "D" in FIG. 8) when the external force is applied in the direction for loosening the threaded engagement. Thus, such conventional threaded engagement device may be released easily by a relatively small external force applied in the direction for loosening the threaded engagement.

Technical Problem

The present invention is directed to solving the above-described problems of the conventional threaded engagement device. Specifically, the present invention relates to a threaded engagement device, which can stably maintain the threaded engagement and minimize the stress concentration at the foot of the load flank to provide a longer usage life.

Solution to Problem

The present invention provides a threaded engagement device to fasten and secure two separate members by engaging a plurality of threads formed in a female thread portion and a plurality of threads of the male thread portion.

The threaded engagement device 1 according to the present invention comprises a female thread portion 10 and a male thread portion 20, which are engaged to each other through a plurality of threads formed along the axis direction. Each thread of the female thread portion 10 and the male thread portion 20 of the threaded engagement device 1 comprises a crest 11, 21 and root 12, 22, which are formed around the circumference of the thread, and a stab flank 13, 23 and load flank 14, 24 connecting the crest 11, 21 and the root 12, 22. The root 12 of the female thread portion 10 comprises a straight portion 15 extending along the axis direction and a concave rounded portion 16, and the root 22 of the male thread portion 20 comprises a concave rounded portion 26. The threaded engagement device 1 of the present invention prevents the threads of the female thread portion 10 and the male thread portion 20 from being damaged due to the stress concentration at the foot of the load flanks 14, 24. Further, the threaded engagement device 1 of the present invention is configured such that a portion of the root 12 of the female thread portion 10 is formed as a straight portion 15 to prevent the male thread portion 20 from being engaged to the female thread portion 10 while being offset from the threaded engagement axis to one side of the female thread portion 10. In the threaded engagement device 1 of the present invention, it is preferred that the rounded portion 26 of the root 22 formed in the male thread portion 20 has a larger radius than the rounded portion 16 formed in the root 12 of the female thread portion 10. Since the load flank 24 of the male thread portion 20 receives the larger stress than the load flank 14 of the female thread portion 10 when engaged, it is preferred to form the rounded portion 26 formed in the root 22 of the male thread portion 20 with a larger radius than the rounded portion 16 formed in the root 12 of the female thread portion 10 to further reduce the stress applied to the male thread portion 20.

In the threaded engagement device 1 of the present invention, it is preferred that the rounded portion 26 in the root 22 of the male thread portion 20 is formed as a substantially full rounded shape. By forming the rounded portion 26 in the root 22 of the male thread portion 20 as the full rounded shape without the straight portion, the threaded engagement device 1 maximizes the radius of the curvature of the rounded portion 26 to more reduce the stress applied to the load flank 24.

Further, the threaded engagement device 1 of the present invention is configured such that the load flanks 14, 24, which are placed at the rear of the threaded engagement direction (in the direction "A" in FIGS. 2 and 5) opposite the stab flanks 13, 23 (which are placed at the front of the threaded engagement direction), makes a negative angle α with the straight line perpendicular to the threaded engagement axis, i.e., the load flanks 14, 24 make an acute angle with the corresponding crests 11, 21. Such configuration allows the threaded engagement device 1 to prevent the threaded engagement of the female thread portion 10 with the male thread portion 20 from being released by the external force applied to in the direction of loosening the threaded engagement and to maintain the threaded engagement securely. More preferably, the load flanks 14, 24 of the threaded engagement device 1 make 83 to 90 degrees with the crests 11, 21.

Further, the present invention provides a rolling mill comprising the threaded engagement device 1 according to the present invention.

Advantageous Effects of Invention

As described above, the threaded engagement device according to the present invention comprises the straight portion parallel to the axial direction and the concave rounded portion. Thus, the threaded engagement device may prevent the male thread portion from being engaged to the female thread portion while being offset from the threaded engagement axis to one side of the female thread portion by the straight portion, and may prevent the female thread portion from being damaged due to the stress concentration at the foot of the load flank by the concave rounded portion. Further, in the threaded engagement device of the present invention, the root of the male threaded portion comprises the rounded portion with the radius of curvature larger than the rounded portion formed in the root of the female thread portion. Thus, the threaded engagement device of the present invention may reduce the stress applied to the load flank of the male thread portion and further enhance usage life of the threaded engagement device.

Furthermore, the threaded engagement device of the present invention is configured such that the load flanks of the female thread portion and the male thread portion make a negative angle with a straight line perpendicular to the threaded engagement axis, i.e., the load flanks make an acute angle with the crest. This allows the threaded engagement to be securely maintained even though the external force in the direction for loosening the threaded engagement.

MODE FOR THE INVENTION

The threaded engagement device 1 according to the present invention will be described hereinafter in detail with reference to the accompanying drawings.

Figure 1:
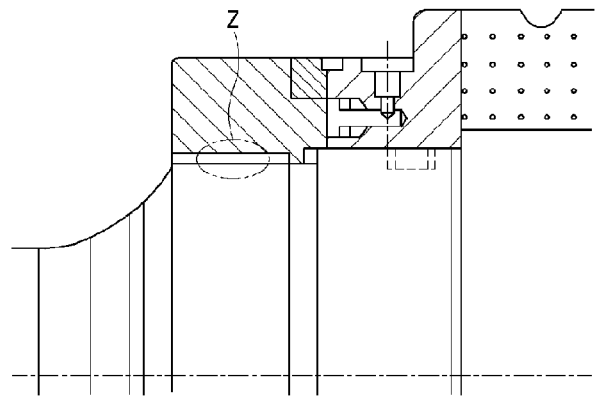
FIG. 1 is a cross section view of the rolling mill having the threaded engagement device according to the present invention.
Figure 2:
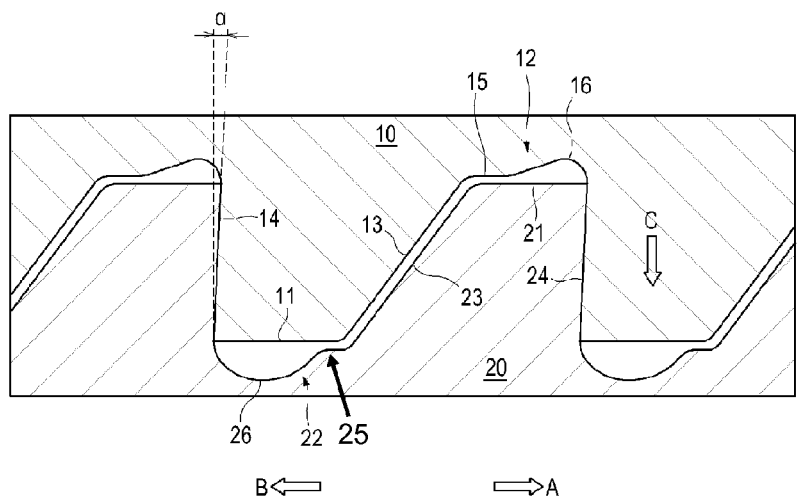
FIG. 2 is an enlarged cross section view of the threaded engagement portion "Z" of the rolling mill in FIG. 1, and shows the state wherein the threaded engagement device according to the one embodiment of the present invention is threaded-engaged.

FIG. 1 shows a portion of a rolling mill, the two components of which are engaged to each other through the threaded engagement device 1 according to the present invention. FIG. 2 shows a threaded engagement structure of the threaded engagement portion "Z" of the rolling mill in FIG. 1.

As shown in FIG. 2, the threaded engagement device 1 comprises a female thread portion 10 and a male thread portion 20 having a plurality of threads formed along the axial direction. The threaded engagement device 1 is configured to fasten and secure two separate members by engaging the threads in the female thread portion 10 and the threads in the male thread portion 20.

Figure 3:
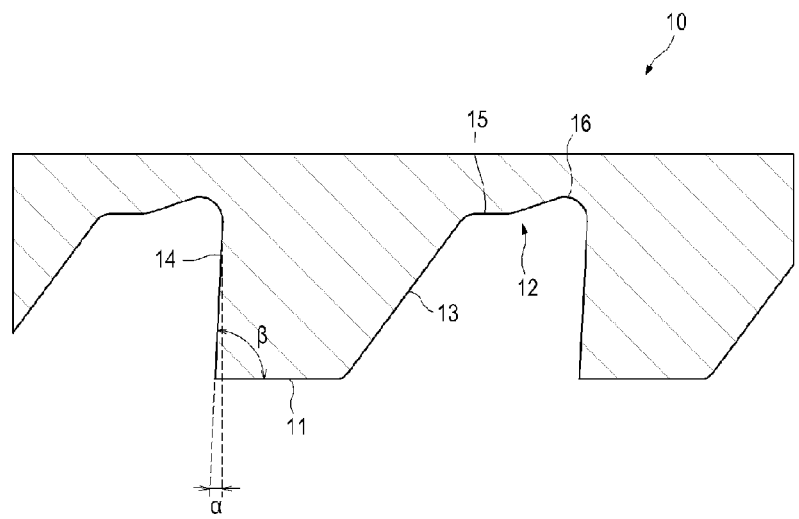
FIG. 3 is a cross section view showing the female thread portion of the threaded engagement device in FIG. 2.

FIG. 3 shows a configuration of the female thread portion 10 of the threaded engagement device 1 in FIG. 2. The female thread portion 10 comprises a plurality of threads formed along the axial direction, wherein each thread comprises four thread surfaces. In particular, the thread of the female thread portion 10 comprises a crest 11 and a root 12, which are formed around the circumference of the thread, and a stab flank 13 and a load flank 14 connecting the crest 11 and the root 12.

Figure 8:
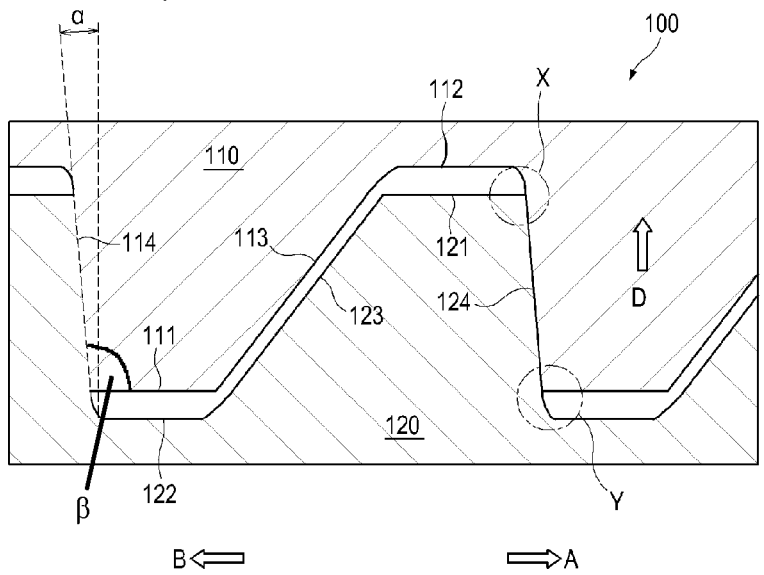
FIG. 8 is a cross section view showing a conventional threaded engagement device.

The crest 11 of the female thread portion 10 is formed parallel to the axial direction as a conventional threaded engagement device. The root 12 of the female thread portion 10 comprises a straight portion 15 extending along the axis direction and a concave rounded portion 16. Unlike a conventional threaded engagement device as shown in FIG. 8, the threaded engagement device 1 of the present invention is configured such that the connecting area between the root 12 and the load flank 14 is formed as the concave rounded portion 16. This prevents the female thread portion 10 from being damaged due to the stress concentration at the foot of the load flank 14. Further, in the threaded engagement device 1 of the present invention, a portion of the root 12 of the female thread portion 10 is formed as a straight portion 15 parallel to the axial direction. Thus, the threaded engagement device 1 of the present invention may prevent the male thread portion 20 from being threaded-engaged to the female thread portion 10 while being offset from the threaded engagement axis to one side of the female thread portion 10. If the root 12 of the female thread portion 10 is formed, for example, as a full rounded shape without a straight portion so as to prevent the stress concentration at the foot of the load flank 14, then the threaded engagement device cannot prevent the male thread portion 20 from being threaded-engaged to the female thread portion 10 while being offset from the threaded engagement axis to one side of the female thread portion 10. As such, the threaded engagement device 1 may be engaged unstably. However, the threaded engagement device 1 of the present invention may prevent the male threaded portion 20 from being engaged to the female thread portion 10 while being offset over the straight portion 15 of the female thread portion 10 since a portion of the root 12 is formed as a straight portion 15 parallel to the axial direction.

Further, the crest 11 and the root 12 of the female thread portion 10 are connected by the stab flank 13 placed at the front of the threaded engagement direction (direction "A" in FIG. 2) and the load flank 14 placed at the rear of the threaded engagement direction. As shown in FIG. 3, the threaded engagement device 1 of the present invention is configured such that the load flank 14 makes a negative angle α with a straight line perpendicular to the threaded engagement axis, i.e., the load flank 14 makes an acute angle β with the crest 11. As such, since the load flank 14 is formed to make a negative angle α with respect to the straight line perpendicular to the threaded engagement axis, the female thread portion 10 would receive the force inwardly (in the direction "C" in FIG. 2) when the external force for loosening the threaded engagement is applied. Thus, the male thread portion 20 may be prevented from being disengaged from the female thread portion 10 in use to stably maintain the engagement of the female thread portion 10 with the male thread portion 20. Also, if the negative angle α between the load flank 14 and the straight line perpendicular to the threaded engagement axis is too large, then the foot of the load flank 14 is subjected to receive a high stress, thereby damaging the threads. Thus, it is preferred that the load flank 14 and the root 12 make an angle β of 83 to 90 degrees.

Figure 4:
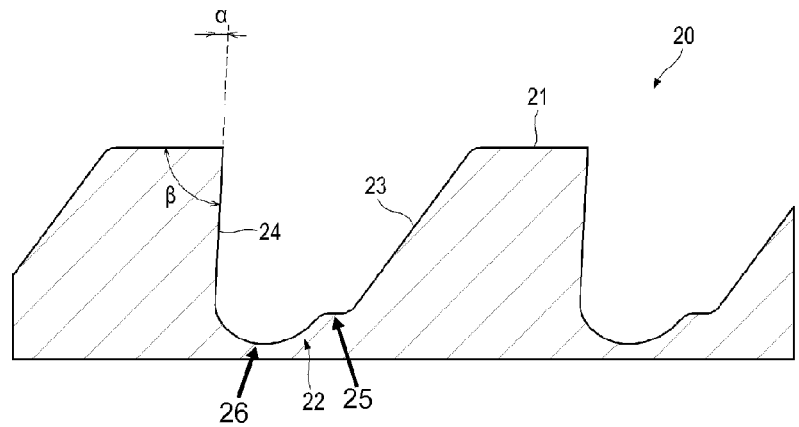
FIG. 4 is a cross section view showing the male thread portion of the threaded engagement device in FIG. 2.

FIG. 4 shows a configuration of the male thread portion 20 of the threaded engagement device 1 in FIG. 2. As shown in FIG. 4, the male thread portion 20 comprises a plurality of threads formed along the axial direction. In particular, the thread of the male thread portion 20 comprises a crest 21 and a root 22, which are formed around the circumference of the thread, and a stab flank 23 and a load flank 24 connecting the crest 21 and the root 22.

Similar to the aforementioned female thread portion 10, the crest 21 of the male thread portion 20 is formed parallel to the axial direction, while the root 22 of the male thread portion 20 comprises a straight portion 25 extending along the axis direction and a concave rounded portion 26. The threaded engagement device 1 may prevent the male thread portion 20 from being damaged due to the stress concentration at the foot of the load flank 24. This is because the connecting area between the root 22 and the load flank 24 is formed as the concave rounded portion 26 as shown in FIG. 4.

When engaging the female thread portion 10 and male thread portion 20 of the threaded engagement device, the load flank 24 of the male thread portion 20 generally receives a larger stress than the load flank 14 of the female thread portion 10. According to the analysis result of the stress distribution applied on each part of the threaded engagement device when the female thread portion 10 and the male thread portion 20 are threaded-engaged, the load flank 14 of the female thread portion 10 generally receives only about 60~80% of the stress applied to the load flank 24 of the male thread portion 20. Thus, the male thread portion 20 of the threaded engagement device 1 is usually broken earlier than the female thread portion 10, which result in that the threaded engagement device 1 should be replaced even though the female engagement member 10 is available. To solve such problem, the threaded engagement device 1 of the present invention is configured such that the radius of the curvature of the rounded portion 26 formed in the root 22 of the male thread portion 20 is larger than the radius of the curvature of the rounded portion 16 formed in the root 12 of the female thread portion 10. As such, by forming the rounded portion 26 formed in the root 22 of the male thread portion 20 with a radius of the curvature larger than the radius of the curvature of the rounded portion 16 formed in the root 12 of the female thread portion 10, the threaded engagement device 1 of the present invention further reduces the stress applied to the load flank 24 of the male thread portion 20 and further enhances usage life of the threaded engagement device 1.

Figure 5:
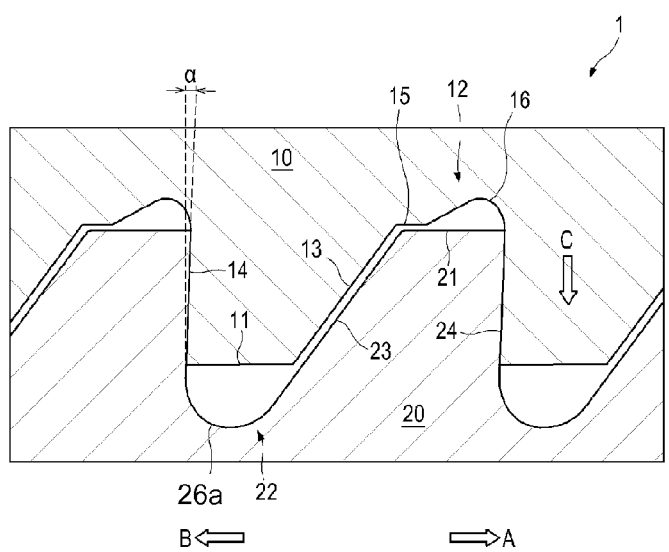
FIG. 5 is a cross section view showing the state wherein the threaded engagement device according to another embodiment of the present invention is threaded-engaged.
Figure 6:
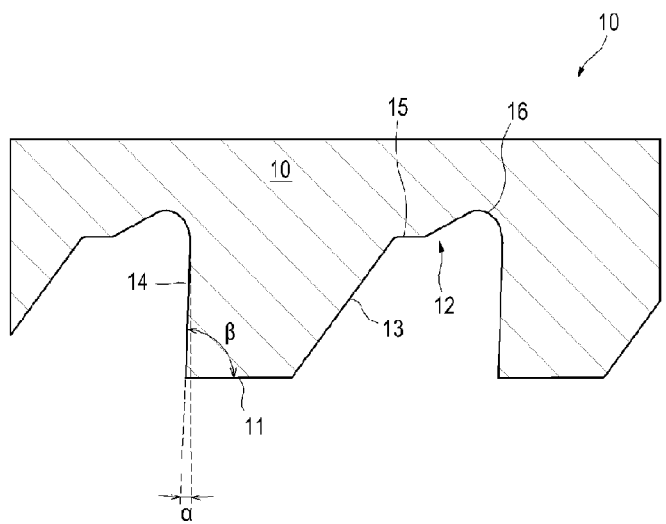
FIG. 6 is a cross section view showing the female thread portion of the threaded engagement device in FIG. 5.
Figure 7:
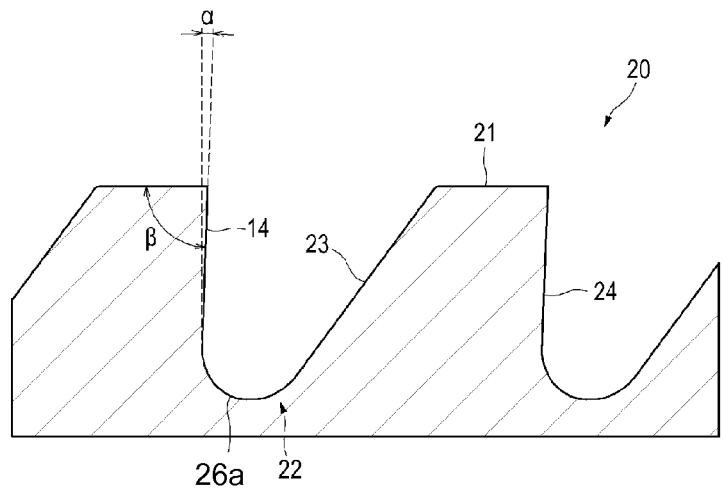
FIG. 7 is a cross section view showing the male thread portion of the threaded engagement device in FIG. 5.

FIG. 5 shows the threaded engagement device 1 according to another embodiment of the present invention. FIGS. 6 and 7 respectively show the female thread portion 10 and the male thread portion 20 of the threaded engagement device 1 in FIG. 5. Components similar to the components of the threaded engagement device in FIG. 2 will be denoted by the same reference numerals with the threaded engagement device in FIG. 2.

As shown in FIG. 5, the threaded engagement device 1 of the present embodiment comprises the female thread portion 10 and the male thread portion 20 having a plurality of threads formed along the axial direction. Further, as shown in FIGS. 6 and 7, the female thread portion 10 and the male thread portion 20 of the threaded engagement device 1 of the present embodiment has a configuration similar to the threaded engagement device 1 in FIG. 2, except for the configuration of the root 22 of the male engagement member 20.

FIG. 7 shows the configuration of the root 22 of the male thread portion 20 of the threaded engagement device 1 in FIG. 5. The root 22 of the male thread portion 20 in the threaded engagement device 1 according to the present embodiment is formed having a concave rounded portion 26a in substantially a full rounded shape. As such, since the root 22 of the male thread portion 20 is formed as a full rounded shape without the straight portion 25, the threaded engagement device 1 of the present embodiment reduces the stress applied to the load flank 24 of the male thread portion 20 more and more, and further enhances the usage life of the threaded engagement device 1.

Further, similar to the embodiment in FIG. 2, the female thread portion 10 and the male thread portion 20 of the threaded engagement device 1 of the present embodiment is configured so that the load flanks 14, 24 make a negative angle α with the straight line perpendicular to the threaded engagement axis, and so angle β is again acute. Thus, the threaded engagement device 1 of the present embodiment may resist against the external forces in the direction for loosening the threaded engagement to stably maintain the engagement of the female thread portion 10 with the male thread portion 20.

It is to be understood that the aforementioned embodiments of the present invention have been described by way of illustration and are not intended to limit the present invention. Numerous variations and modifications can be made without departing from the spirit of the present invention by those of ordinary skilled in the art.

What is claimed is:

1. A threaded engagement device having a female thread portion and a male thread portion engaged to each other through a plurality of threads formed along an axis direction of the device;
   wherein each thread in the female thread portion and male thread portion has a crest and a root formed around the circumference of the thread, and a stab flank and a load flank connecting the crest and the root;
   wherein the root of the female thread portion comprises a straight portion extending along the axis direction and a concave rounded portion;
   wherein the root of the male thread portion comprises a concave rounded portion; and
   wherein a radius of curvature of the rounded portion in the male thread portion is larger than a radius of curvature of the rounded portion in the female thread portion.

2. A rolling mill comprising the threaded engagement device according to claim 1.

3. The threaded engagement device according to claim 1, wherein the rounded portion of the male thread portion is formed as substantially a full rounded shape.

4. A rolling mill comprising the threaded engagement device according to claim 3.

5. The threaded engagement device according to claim 1, wherein the load flank of the thread, which is placed at the rear of the threaded engagement direction opposite the stab flank, makes an angle of less than 90 degrees with the crest.

6. A rolling mill comprising the threaded engagement device according to claim 5.

7. The threaded engagement device according to claim 1, wherein the load flank of the thread, which is placed at the rear of the threaded engagement direction opposite the stab flank, makes an angle of 83 to 90 degrees with the crest.

8. A rolling mill comprising the threaded engagement device according to claim 7.

9. The threaded engagement device according to claim 1, wherein the root of the male thread portion further comprises a straight portion extending along the axis direction connected to the concave rounded portion.

10. A rolling mill comprising the threaded engagement device according to claim 9.

* * * * *